United States Patent [19]

Sugihara et al.

[11] Patent Number: 5,102,673

[45] Date of Patent: Apr. 7, 1992

[54] OXYGEN ABSORBENT

[75] Inventors: Yasuo Sugihara; Teruo Takeuchi; Hidechika Wakabayashi; Akira Hosomi; Toshio Komatsu, all of Tokyo, Japan

[73] Assignee: Mitsubishi Gas Chemical Company, Inc., Tokyo, Japan

[21] Appl. No.: 602,588

[22] Filed: Oct. 24, 1990

[30] Foreign Application Priority Data

Oct. 25, 1989 [JP] Japan .................... 1-275906

[51] Int. Cl.$^5$ .................... C01B 13/00; B65D 85/00
[52] U.S. Cl. .................... 426/124; 206/213.1; 206/328; 206/205; 252/188.28; 252/389.4; 252/389.41; 252/397; 423/219; 426/324; 426/398; 426/541
[58] Field of Search ............... 426/398, 124, 324, 541; 423/219; 206/205, 213.1, 211, 328; 252/389.4, 389.41, 188.28, 397

[56] References Cited

U.S. PATENT DOCUMENTS

| | | | |
|---|---|---|---|
| 2,566,923 | 9/1951 | Burbhart | 252/389.4 |
| 2,982,733 | 5/1961 | Wright | 252/389.4 |
| 3,670,874 | 6/1972 | Brunner | 426/124 |
| 4,230,595 | 10/1980 | Yamaji et al. | 252/188.28 |
| 4,256,773 | 3/1981 | Itoga et al. | 426/415 |
| 4,266,977 | 5/1981 | Steiger | 561/87 |
| 4,317,742 | 3/1982 | Yamaji et al. | 426/541 |
| 4,349,509 | 9/1982 | Yoshikawa et al. | 426/87 |
| 4,512,960 | 4/1985 | Szwarc | 423/219 |
| 4,528,281 | 7/1985 | Sutt, Jr. | 423/219 |
| 4,756,820 | 7/1988 | Reid et al. | 252/389.41 |
| 4,766,229 | 8/1988 | Kobayashi | 252/188.28 |
| 4,956,016 | 9/1990 | Opitz et al. | 252/389.4 |
| 4,976,942 | 12/1990 | Kitahara et al. | 423/219 |

FOREIGN PATENT DOCUMENTS

| | | | |
|---|---|---|---|
| 0128577 | 11/1978 | Japan | 426/324 |
| 57-74367 | 5/1982 | Japan | 252/389.4 |

OTHER PUBLICATIONS

Condensed Chemical Dictionary, Hawley, 10th Ed., pp. 144, 874.
Chem. Abstracts CA108(4):25789a Abstracting "Effects of Lithium, Boron", Magnesium and Yttrium on the Oxygen Activity of Molten Copper, Rasplavy 1(2)43–46, 1987.
Chem. Abstracts CA69(26):109241e, Abstracting "Deoxidation of Sintered Molybdenum with Carbon, Boron, and silicon", J. Less-Common Metals 16(3), 249–264, 1968.

*Primary Examiner*—Donald E. Czaja
*Assistant Examiner*—J. Aberle
*Attorney, Agent, or Firm*—Armstrong, Nikaido, Marmelstein, Kubovcik & Murray

[57] ABSTRACT

There are disclosed an oxygen absorbent comprising boron or a reducing boron compound, an alkaline substance and a carrier, an oxygen absorbent parcel formed by enclosing said oxygen absorbent in a permeable packaging parcel, a food package and a package of a metallic or electronic product or part containing said oxygen absorbent parcel.

5 Claims, No Drawings

OXYGEN ABSORBENT

BACKGROUND OF THE INVENTION

The present invention relates to an oxygen absorbent. In more particular, it relates to a novel oxygen absorbent comprising boron or a reducing boron compound as the major constituent.

The term "oxygen absorbent" used in the present specification and claims refers to a substance which has functions of absorbing oxygen and also absorbing moisture and acidic substances and exerts such useful effects in storing various goods as disinfection, mildew-proofing, insect proofing, and prevention of oxidation, fading, discoloration and rusting, etc. by removing oxygen, moisture and acidic substances from the atmosphere surrounding said oxygen absorbent. It is usually employed to mean an oxygen absorbent composition having the above-mentioned functions and effects but sometimes employed in the sense of a parcel containing the oxygen absorbent composition. A rate of absorbing oxygen in said oxygen absorbent is accelerated by maintaining in advance water.

One of the techniques employed for storage of foods, etc. is the use of an oxygen absorbent. This technique comprises placing an oxygen absorbent together with foods etc. in a hermetically sealed bag or a tightly closed container (hereinafter sometimes referred to simply as a sealed container or a container) with gas barrier property to make the atmosphere in the sealed container substantially free from oxygen and thereby to inhibit the oxidation of foods etc. and the growth or proliferation of bacteria and mildew, and is used in storing a vast variety of foods, etc. Oxygen absorbents used so far are those which comprise iron powders as the major constituent for reasons of oxygen absorbing capacity, ease of handling, safety, cost, and so forth.

In the case of packaged foods, for example, it is a common practice, after the foods have been hermetically sealed in a packaging bag, to inspect the package with a metal detector in order to check contamination by foreign matter.

However, said oxygen absorbent comprising iron powders as the major constituent is naturally detected by the metal detector, so that the metal detector test cannot be applied to food packages etc. having the oxygen absorbent enclosed therein.

As for corrosion inhibition techniques for metals and metallic articles, there have so far been known the use of corrosion preventive oils, volatile corrosion inhibitors, volatile corrosion inhibitive paper, etc., and these methods are described as "the general rules for corrosion preventive packaging" in JIS Z 0303-1035.

However, these methods are featured by coating or spraying onto the metal surface substances which have a corrosion preventive effect, so that they cannot be used for metals and metallic articles which should be desirably kept away from the contact with such substances, e.g., reagents, electronic parts and semiconductors.

It is frequently practiced to seal a metallic article together with a desiccant, such as silica gel, in a packaging material having a low gas permeability and moisture permeability to effect corrosion inhibition. Such a method is, for example, provided for as "silica gel desiccant for packaging" in JIS Z 0701-1977. This method, however, merely reduces the relative humidity in the sealed container by the use of a desiccant and can give only an effect of retarding the rust formation due to oxidation.

Another corrosion inhibition technique for metals, which uses an oxygen absorbent, is disclosed in Japanese Patent Application Kokoku (Post-Exam. Publn.) No. 62-040,880. It comprises enclosing a metal or metallic article in a gas barrier packaging material together with a parcel formed by filling an oxygen absorbent into a gas-permeable packaging material, to produce a substantially oxygen-free condition in the sealed enclosure and thereby to effect the corrosion inhibition of the metal.

Many proposals have already been made regarding the substances used as the oxygen absorbent. There have been known, for example, those which comprises as the major constituent sulfites, catechol, ascorbic acid and/or its salts, or metal powders.

However, the above-mentioned oxygen absorbents require water to absorb oxygen and hence absorbents used in practice contain water therein. Said water may evaporate from the oxygen absorbent to increase the relative humidity in the closed system and often to cause rusting in spite of the substantially oxygen-free condition kept in the system.

Further, when the oxygen absorbent, or the metallic article to be stored itself, produces an acidic gas, the acidic gas may greatly promote rust formation.

As described above, although a corrosion inhibitor which has an oxygen absorbing function, a drying function and further, desirably, a function of absorbing an acidic gas in combination has been awaited for corrosion inhibition of metals and metallic articles, the products of the prior art are all insufficient in some of these functions and are not satisfactory for use as a corrosion inhibitor.

SUMMARY OF THE INVENTION

The object of the present invention is to provide an oxygen absorbent which is not detected on inspection with a metal detector, and further to provide an oxygen absorbent which has, in combination, an oxygen absorbing ability, drying function and further acidic gas absorbing ability.

The present inventors have made extensive study to solve the above-mentioned problems and resultantly found that a novel composition comprising boron, or a reducing boron compound, an alkaline substance and a carrier has an excellent oxygen absorbing ability in combination with a drying function and an acidic gas absorbing ability. The present invention has been attained based on the above finding.

Thus, the present invention provides an oxygen absorbent comprising boron, or a reducing boron compound, an alkaline substance and a carrier.

The present invention further provides an oxygen absorbent parcel formed by enclosing said oxygen absorbent in a permeable packaging parcel.

The term "permeable" used in the present invention refers to the property of a material which permits an acid or water or both to permeate.

The present invention still further provides a package of food or a package of a metallic or electronic product or part which is formed by enclosing said oxygen absorbent parcel together with food or a metallic or electronic product or part in a non-permeable packaging bag or an air-tight container, followed by hermetic sealing or tight closing.

DETAILED DESCRIPTION OF THE INVENTION

The oxygen absorbent provided by the present invention to solve the above-mentioned problems may be a composition comprising (1) boron or a reducing boron compound, (2) an alkaline substance and (3) a carrier, or a composition further comprising other constituents in addition to said composition according to necessity.

The major constituent of the oxygen absorbent is boron or a reducing boron compound, boron being preferred. The boron needs not be a pure material, and may contain impurities. The reducing boron compound may be, for example, borides such as iron boride and calcium boride, boric acids of lower valences or their salts, such as hypo-boric acid or the salts, or reduction products of boron oxide with silicon, magnesium, etc. or their salts. These compounds need not always be purified, and may contain impurities so long as the compounds contain a necessary and sufficient amount of boron. They may also be mixtures of two or more thereof.

The alkaline substance is a substance which exhibits alkaline upon acting on water or dissolving in water. Preferred examples thereof include the hydroxides, carbonates, hydrogen carbonates, tertiary phosphates, secondary phosphates, aluminates, silicates, borates and other salts of alkali metals and alkaline earth metals, particularly preferred among them being alkali metal hydroxides. Specific examples of preferred such substances include sodium carbonate, potassium hydrogen carbonate, sodium hydroxide, potassium hydroxide and lithium hydroxide, particularly preferred among them being sodium hydroxide, potassium hydroxide, and lithium hydroxide. The alkaline substances may be used each alone or in a combination of two or more thereof. The amount of the alkaline substance mixed with boron or a reducing boron compound is preferably 10 parts (parts by weight, the same applies hereafter) or more, more preferably 30–1,000 parts, relative to 100 parts of boron or the boron reducing compound. When the amount of the alkaline substance mixed is below said range, the oxygen absorbing capacity of the resulting composition is undesirably small, whereas when the amount is above said range the oxygen absorbing capacity per unit weight of the resulting composition is low, necessitating to increase the size of the packaging material used for packing the composition, which may cause trouble in changing the parcel into a food package and also be undesirable from the viewpoint of the appearance of the package.

The carriers may be, for example, activated carbon, zeolite, pearlite, diatomaceous earth, activated clay, silica, kaolin, talc, bentonite, activated alumina, gypsum, silica alumina, calcium silicate, magnesium oxide, graphite, carbon black, aluminum hydroxide, iron oxide, calcium hydroxide, etc., each in the form of powders or granules. Particularly preferably used among them is activated carbon. Activated carbons derived from woody material or pitch are effectively used. The carriers may be used each alone or in a combination of two or more thereof. Incorporation of the carrier makes it possible to increase the oxygen absorbing velocity or oxygen absorbing capacity and to facilitate the handling of the composition. It further makes it possible to increase the contact area of the liquid constituent in the composition with oxygen. The amount of the carrier to be incorporated is not particularly limited and may be selected appropriately in relation to other constituents, but is preferably 0.1–10,000 parts, particularly preferably 1–10,000 parts, relative to 100 parts of boron or the reducing boron compound. In the case of activated carbon, the amount thereof to be mixed is preferably 10 parts or more, more preferably 30–10,000 parts, relative to 100 parts of boron. When the amount of activated carbon mixed is below said range the oxygen absorbing capacity of the resulting composition is undesirably small, whereas when the amount is in excess of said range it will not contribute to increasing the oxygen absorbing capacity and will make the weight and the volume of the composition too large.

Water may be added to the composition besides the above-mentioned constituents. The addition of water makes it possible to increase the oxygen absorbing capacity. The amount of water, when it is added, is not particularly limited, but is preferably adjusted to not more than 70% by weight, more preferably not more than 50% by weight, of the whole composition. When the amount of water added is above said range, the resulting composition assumes the form of paste and has a decreased contact area with oxygen.

The method of mixing the above-mentioned respective constituents is not particularly limited. When the constituents are liquid and powder, any described method may be used so long as it permits uniform mixing of the respective constituents. When a granular constituent is used, mixing may be performed, for example, by impregnating the granular constituent with a liquid constituent and then covering the resulting granules with a powdery constituent.

The mixture of the respective constituents mentioned above is usually enclosed into a permeable packaging material to form a parcel. For example, the respective constituents are mixed and then packed with a packing machine in a pouch formed by heat-sealing the peripheral part of a permeable packaging material, to give an oxygen absorbent parcel.

The oxygen absorbent parcel can be used in storing foods or the like by such methods as enclosing the parcel together with food or the like in a non-permeable packaging bag followed by hermetic sealing or putting it together with food or the like into an air-tight container followed by tight closing. It can also be used in storing metallic or electronic products or parts in the same manner.

The oxygen absorbent of the present invention may be incorporated, according to necessity, with other additives.

To granulate the oxygen absorbent and thereby to improve its flowability in filling operation, there may be used fillers such as zeolite, pearlite, diatomaceous earth, activated clay, silica, kaolin, talc, bentonite, activated alumina, gypsum, silica alumina, calcium silicate, magnesium oxide, graphite, carbon black, aluminum hydroxide, iron oxide, and calcium hydroxide. Further, there may be favorable used as a binder for granulation glycerol, sorbitol, glucose, sucrose, polyacrylic acid, polyvinyl alcohol, lysine, etc.

The method of mixing the respective constituents mentioned above is not particularly restricted in the present invention. Conventional dry blenders or grinderblenders may be used for said mixing to obtain the intended composition. Also, the mixture may be made into granules by using a technique of granulation, e.g. tumbling granulation or the use of an extruder. When a constituent which is difficult to pulverize, as potassium hydroxide, is used, it may be mixed separately as it is in the form of granules.

The oxygen absorbent is usually employed after filled in a permeable packaging parcel or container.

DESCRIPTION OF THE PREFERRED EMBODIMENTS

Example 1

A mixture of 2 g of boron powder, 2 g of potassium hydroxide and 3 g of activated carbon was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 1,000 ml of air into a bag formed of a laminate of polyvinylidene chloride-coated stretched nylon and polyethylene, then the bag was hermetically sealed and allowed to stand in an atmosphere of 25° C. After 3 days, the oxygen concentration in the bag was determined by gas chromatography and found to be less than 0.1%, the lower limit of the analysis. Also, the hydrogen concentration in the bag determined simultaneously was found to be less than 0.1%, the lower limit of the analysis.

The oxygen absorbent parcel obtained above was subjected to a detection test on a metal detector, to confirm that it was not detected as a metallic foreign substance.

Example 2

A mixture of 2 g of boron powder, 2 g of sodium hydroxide, 2 g of water and 3 g of activated carbon was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 1,000 ml of air into a bag formed of a laminate of polyvinylidene chloride-coated stretched nylon and polyethylene, then the bag was hermetically sealed and allowed to stand in an atmosphere of 25° C. After 3 days, the oxygen concentration in the bag was determined by gas chromatography and found to be less than 0.1%, the lower limit of the analysis. Also, the hydrogen concentration in the bag, determined simultaneously was found to be less than 0.1%, the lower limit of the analysis.

The oxygen absorbent parcel obtained above was subjected to a detection test on a metal detector, to confirm that it was not detected as a metallic foreign substance.

EXAMPLE 3

A mixture of 10 g of boron powder, 10 g of sodium hydroxide, 10 g of water and 15 g of carbon black was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 1,000 ml of air into a bag formed of a laminate of polyvinylidene chloride-coated stretched nylon and polyethylene, then the bag was hermetically sealed and allowed to stand in an atmosphere of 25° C. After 3 days, the oxygen concentration in the bag was determined by gas chromatography and found to be less than 0.1%, the lower limit of the analysis. Also, the hydrogen concentration in the bag determined was found to be less than 0.1%, the lower limit of the analysis.

The oxygen absorbent parcel obtained above was subjected to a detection test on a metal detector, to confirm that it was not detected as a metallic foreign substance.

EXAMPLE 4

A mixture of 5 g of iron boride powder, 5 g of sodium hydroxide, 5 g of water and 9 g of activated carbon was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 1,000 ml of air into a bag formed of a laminate of polyvinylidene chloride-coated stretched nylon and polyethylene, then the bag was hermetically sealed and allowed to stand in an atmosphere of 25° C. After 3 days, the oxygen concentration in the bag was determined by gas chromatography and found to be less than 0.1%, the lower limit of the analysis. Also, the hydrogen concentration in the bag determined simultaneously was less than 0.1%, the lower limit of the analysis.

Comparative Example 1

A mixture of 2 g of iron powder, 2 g of sodium chloride, 2 g of water and 3 g of activated carbon was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 1,000 ml of air into a bag formed of a laminate of polyvinylidene chloride-coated stretched nylon and polyethylene, then the bag was hermetically sealed and allowed to stand in an atmosphere of 25° C. After 3 days, the oxygen concentration in the bag was determined by gas chromatography and found to be less than 0.1%, the lower limit of the analysis. The hydrogen concentration in the bag determined simultaneously was 5%.

The oxygen absorbent parcel was detected as a metallic foreign substance in the metal detector test.

EXAMPLE 5

In 1 kg of unpolished rice were kept 400 rice weevil adults for 1 week and then the adults were removed from the rice. The unpolished rice left behind was divided into 40 g portions, which were then used as the samples for the following test.

The 40 g portion of unpolished rice of the sample and the oxygen absorbent parcel obtained in Example 2 were enclosed into a bag formed of a laminate of polyethylene and polyvinylidene chloride-coated stretched nylon, and the bag was hermetically sealed so as to give a volume of air in the bag of 1,000 ml. Ten (10) identical specimens were thus prepared and stored in a constant temperature chamber at 20° C. After stored for 20 days, the bag was opened, placed as such in a room at 25° C., and the number of rice weevils which emerged from the unpolished rice was recorded.

As a control, an exactly the same test as above was performed except that the oxygen absorbent parcel was not enclosed in the bag. The number of rice weevils which emerged in this test was taken as 100%.

The test results are shown in Table 1.

TABLE 1

| | Number of rice weevils which emerged from egg | Emergence rate of rice weevil eggs |
| --- | --- | --- |
| Example 5 | 0 | 0% |
| Control | 1,500 | 100% |

EXAMPLE 6

To a mixture of 3 g of boron powder, 0.3 g of lithium hydroxide and 0.5 g of activated carbon was added 2 of granular potassium hydroxide, to obtain an oxygen absorbent. The absorbent was enclosed into a pouch (50 mm in length and 80 mm in width) prepared by using a packaging material formed by laminating paper and porous polyethylene, to obtain an oxygen absorbent parcel. The oxygen absorbent parcel was enclosed together with 250 ml of air containing about 100 ppm of hydrogen chloride into a bag formed of a laminate of polyvinylidene chloride-coated stretched nylon and polyethylene, then the bag was hermetically sealed and allowed to stand in an atmosphere of 25° C. The oxygen concentration, relative humidity and hydrogen chloride concentration in the bag immediately after sealing and after 3 days of standing were determined, and the results are shown in Table 2. The results reveal that oxygen and hydrogen chloride were completely removed to below the lower limit of analysis, and the relative humidity was also reduced to below 30%, which value is generally accepted as effective in corrosion inhibition.

TABLE 2

| | Days | |
| --- | --- | --- |
| Items | Immediately after sealing | After 3 days |
| Oxygen concentration (%) | 20.9 | 0.1 or below |
| Relative humidity (%) | 49 | 13 |
| Hydrogen chloride concentration (ppm) | 97 | 5 or below |

EXAMPLE 7

To a mixture of 0.3 g of boron powder, 0.6 g of saturated aqueous potassium hydroxide solution and 0.5 g of activated carbon was added 3 g of granular potassium hydroxide, to obtain an oxygen absorbent. The absorbent was enclosed into a pouch (50 mm in length and 80 mm in width) prepared by using a packaging material formed by laminating paper and porous polyethylene, to obtain an oxygen absorbent parcel. The oxygen absorbent parcel was enclosed together with a chemical polished copper test piece (60 mm in width, 80 mm in length and 0.5 mm in thickness) and 250 ml of air into a bag formed of a laminate of polyvinylidene chloride-coated stretched nylon and polyethylene, then the bag was hermetically sealed and allowed to stand in an atmosphere of 25° C. The oxygen concentration and relative humidity in the bag after 7 days and after 14 days were analyzed, and further the surface condition of the copper test piece was examined. The results are shown in Table 3.

TABLE 3

| | Days | | |
| --- | --- | --- | --- |
| Items | Immediately after sealing | After 7 days | After 14 days |
| Oxygen concentration (%) | 20.9 | 0.1 or below | 0.1 or below |
| Relative humidity (%) | 49 | 14 | 15 |

TABLE 3-continued

| | Days | | |
| --- | --- | --- | --- |
| Items | Immediately after sealing | After 7 days | After 14 days |
| Surface state of copper test piece | — | No discoloration | No discoloration |

COMPARATIVE EXAMPLE 2

The same procedures as in Example 2 were followed except that a mixture of 1 g of iron powder, 0.3 g of water, 1 g of sodium chloride and 1 g of activated carbon was used as the oxygen absorbent. The results thus obtained are shown in Table 4. Although oxygen was completely removed to below the lower limit of analysis, the relative humidity increased and the test piece surface showed discoloration due to oxidation.

TABLE 4

| | Days | |
| --- | --- | --- |
| Items | Immediately after sealing | After 7 days |
| Oxygen concentration (%) | 20.9 | 0.1 or below |
| Relative humidity (%) | 49 | 82 |
| Surface state of copper test piece | — | Discoloration over appreciable surface area |

The oxygen absorbent of the present invention, which uses no iron powder, is not detected even when subjected to a metal detector test after enclosed together with food and hermetically sealed, so that the packaged food can be inspected for contamination by foreign substances. Further, the present absorbent produces no hydrogen, so that it is highly safe in use.

The oxygen absorbent of the present invention can be used not only in storing foods (e.g., for mildew-proofing, insect-proofing, prevention of pultrefaction caused by bacteria, prevention of oxidative degradation, preservation of taste and freshness, prevention of fading, etc.), but also in a vast variety of fields including storage of goods which are adversely affected by the presence of oxygen, e.g., medicines, clothing, furs, medical instruments and apparatuses, precision instruments and apparatuses, electronic instruments and apparatuses, electronic materials and parts, and curios; mildew-proofing, insect-proofing, prevention of fouling by microorganics as bacteria etc., prevention of oxidation, prevention of fading and corrosion prevention.

The oxygen absorbent of the present invention has an oxygen absorbing ability, drying function and further acidic gas absorbing ability in combination and can be suitably used in corrosion-preventive storage of metals, such as copper, silver and aluminum, and the products thereof, as well as semiconductor devices, such as lead frames, IC chips and silicon wafers.

What is claimed is:

1. An oxygen absorbent comprising boron, an alkaline substance and activated carbon.

2. An oxygen absorbent according to claim 1 wherein at least one of the alkaline substances is an alkali metal hydroxide.

3. An oxygen absorbent parcel formed by enclosing the oxygen absorbent according to claim 1 in a permeable packaging parcel.

4. A food package formed by enclosing the oxygen absorbent parcel according to claim 3 together with foods in a non-permeable packaging bag or an air-tight container followed by hermetic sealing or tight closing.

5. A package of a metallic or electronic product or part formed by enclosing the oxygen absorbent parcel according to claim 3 together with a metallic or electronic product or part in a non-permeable packaging bag or an air-tight container followed by hermetic sealing or tight closing.

* * * * *